3,123,107
PARTICULATE MATERIAL TRANSFER
MECHANISM
Rubin E. Kappler, Baytown, Tex., assignor, by mesne assignments, to Esso Research and Engineering Company, Elizabeth, N.J., a corporation of Delaware
Filed May 31, 1962, Ser. No. 199,174
3 Claims. (Cl. 141—352)

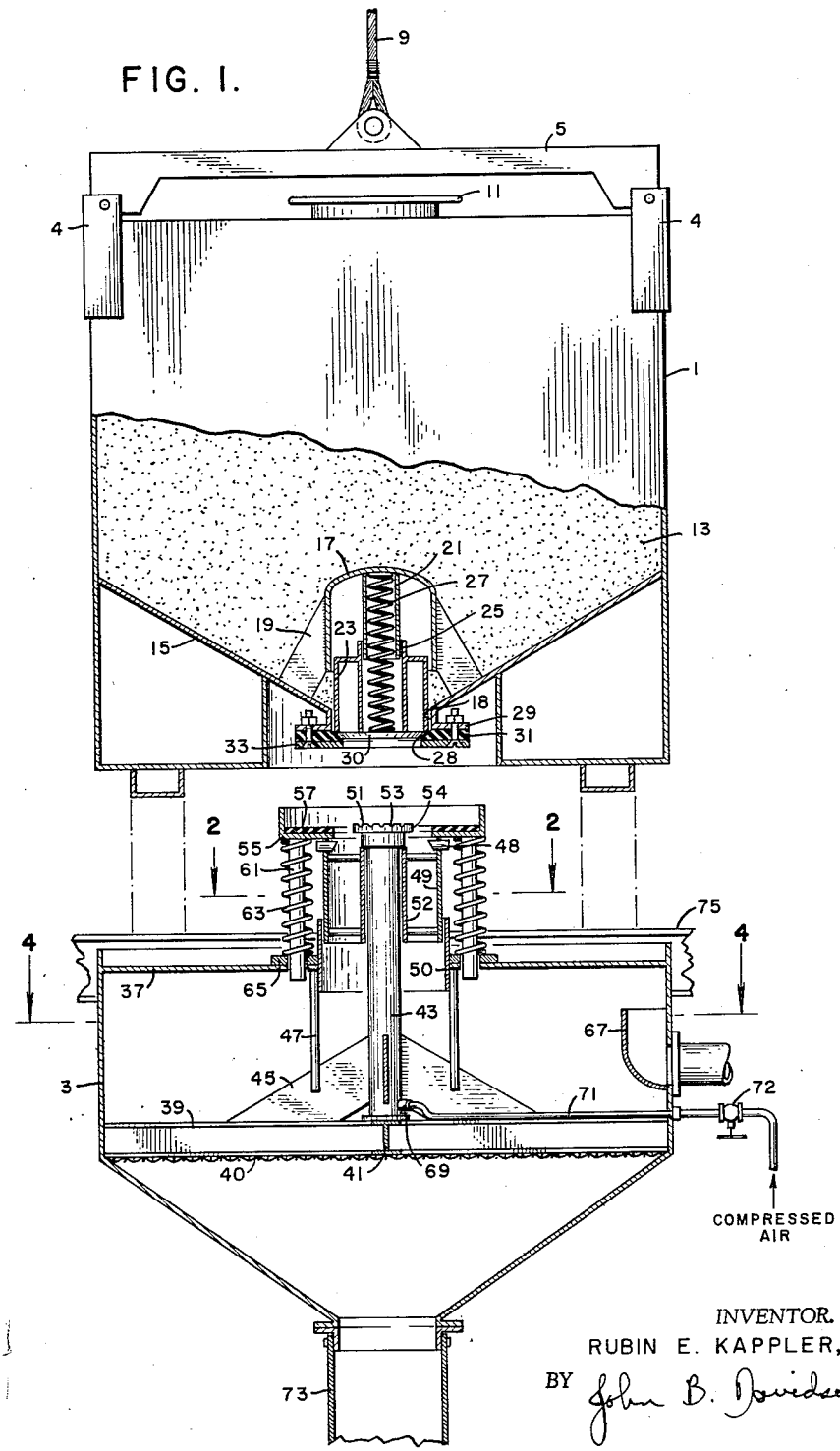

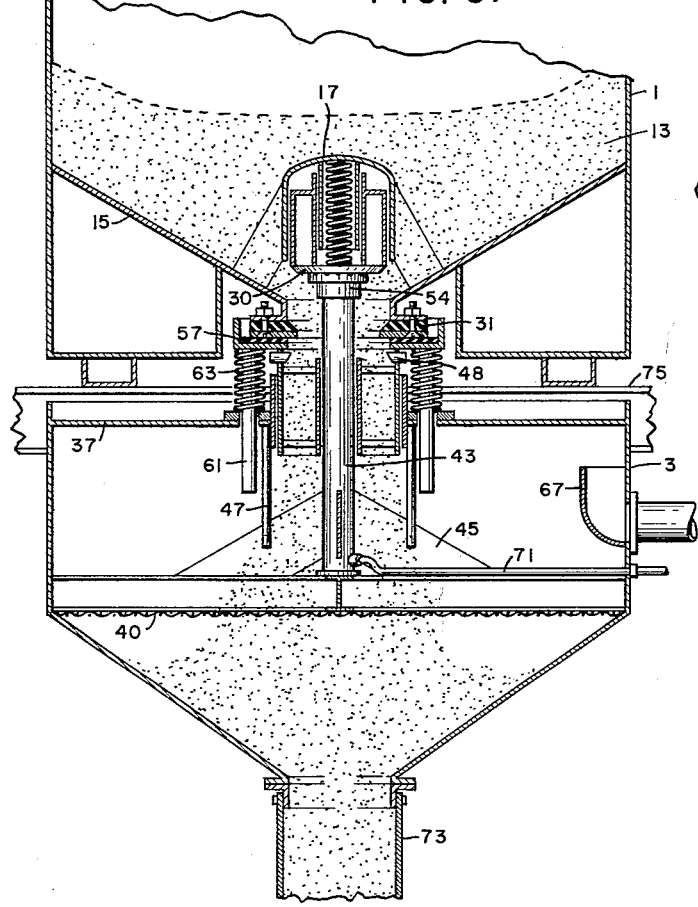
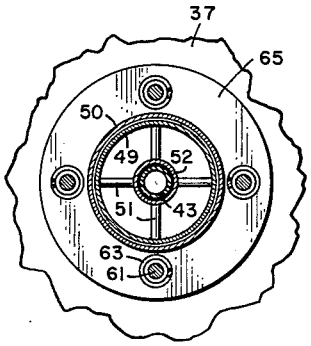
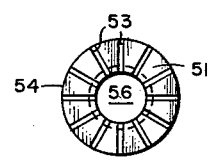
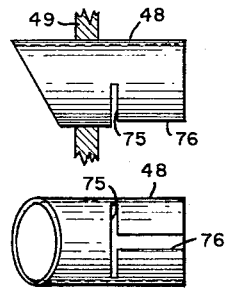
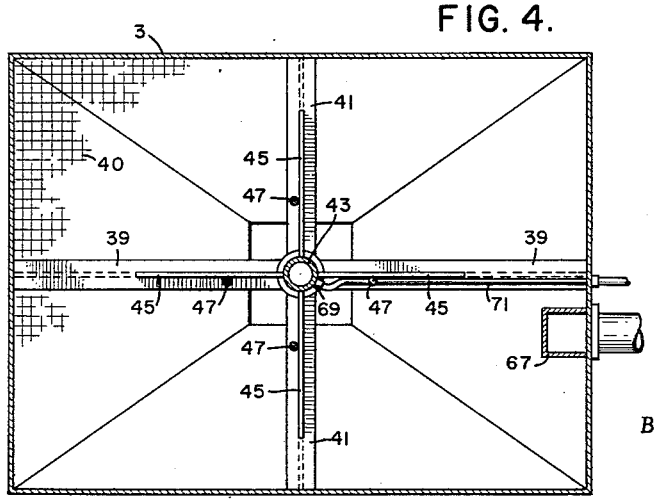
INVENTOR.
RUBIN E. KAPPLER,
BY John B. Davidson
ATTORNEY.

This invention relates to apparatus for transferring fluent material between levels, and more particularly to a bin and hopper apparatus for transferring between levels particulate solid material of high economic value.

Bin and hopper arrangements have been used for many years in connection with the transfer between levels of particulate materials such as flour and ore. The usual arrangement for unloading bins into hoppers is simply an apparatus for tilting the bin. In connection with the transfer of materials of high economic value, such as platinum catalysts used in the oil industry, such an arrangement has been found to be unsatisfactory. It is highly desirable to use the bin and hopper arrangement for transferring the catalyst mixture from one operation to the next operation, but for reasons of cost and because of the possibility of losing expensive catalyst material, commercially available apparatus has been found to be unsatisfactory.

Objects of the present invention not apparent from the above discussion will become evident upon consideration of the following detailed description of the invention when taken in connection with the accompanying drawings, wherein:

FIG. 1 is a cross-sectional view, partially in elevation, of a bin and hopper arrangement in accordance with the invention;

FIG. 2 is a sectional view taken along section 2—2 of FIG. 1;

FIG. 3 is a top view of the ram 43 depicted in FIG. 1;

FIG. 4 is a cross-sectional view taken along section 4—4 of FIG. 1;

FIG. 5 is a view similar to FIG. 1 showing the apparatus in its actuated position;

FIG. 6 is an enlarged perspective view of the sonic indicator 48 illustrated in FIGS. 1 and 5; and FIG. 7 is a bottom view of the sonic indicator.

With reference now to the drawings in general, and to FIG. 1 in particular, there is shown a bin 1 positioned directly above a hopper 3. The bin 1 is suspended from a cable 9 by means of a plurality of lifting lugs 4 and a lifting bridle 5. The bin is provided with a downwardly coning bottom 15 having a central opening 18 therein. Particulate catalyst material 13 is shown contained within the bin above the downwardly coning bottom.

An annular flange member 29 is affixed to the downwardly coning bottom 15 around the central opening 18. An annular neoprene gasket 31 is affixed to flange member 29 by an annular plate 33. The gasket 31 has a tapered surface 28 which serves as a valve seat.

A cylindrical bell-shaped member 17 having an open bottom is affixed to the bin bottom 15 above opening 18 by a plurality of stanchions 19. A movable member for closing the central opening comprises a valve plate 30 adapted to seat on the tapered surface 28 of neoprene gasket 31, and an annular cylindrical member 23 extending upwardly from the plate to engage the inner surface of the bell member 17. Cylindrical sleeves 25 and 21 respectively extending upwardly from plate 30 and downwardly from the top of the bell member 17 are provided to house a coil spring 27 positioned between the plate 30 and the bell member 17. The coil spring 27 urges the plate against the neoprene gasket 31 to close the central opening.

The construction of hopper 3 is understood most readily by considering FIGS. 2, 3, and 4 along with FIG. 1. Hopper 3 is provided with a cover plate 37 extending inwardly from the bin at the upper end thereof. Hopper 3 is provided with a central opening directly beneath the central opening 18 of the bin bottom 15. An elongated ram 43 is vertically disposed in the hopper 3 and supported on crossed support beams 39 and 41 by support members 45. Rods 47 are welded or otherwise affixed to support members 45 for the purpose of supporting the relatively thin cover plate 37 around its central opening.

A wire mesh or screen 40 is affixed to the underside of beams 39 and 41 and extends to the walls of the hopper to screen out oversized particles of foreign materials. The screen 40 may be affixed at other locations, such as on top of beams 39 and 41.

For the purpose of providing a sealed annulus around the ram between the edges of the central openings of the bin bottom 15 and the cover plate 37, there is provided an arrangement including sleeve members 49, 50, and 52 and an annular flange 55. Sleeve member 50 is welded or otherwise affixed to the inner edge of the cover plate 37 at the central opening thereof so as to extend above and below the cover plate. The sleeves 49 and 52 are connected together, sleeve 49 being in sliding fit with sleeve 50, and sleeve 52 being in sliding fit around ram 43 (see FIGS. 1 and 2). The annular flange 55 is welded or otherwise affixed to the upper end of sleeve 49 and is provided with an annular rubber sealing member 57 adapted to engage the annular plate 33 so as to be in sealing contact therewith. A plurality of coil springs 63 are disposed between plate 55 and shims or reinforcing pad 65 on cover plate 37 to urge upwardly the annular plate 55 and sleeves 49, 52. Rods 61 affixed to plate 55 extend through small openings in reinforcing pad 65 and cover plate 37 to provide support for springs 63. The upper face 51 of ram head 54 is disposed slightly above the upper surface of sealing member 57. Preferably, the differential level therebetween may be equal to or slightly less than the differential level between the bottom of valve plate 30 and the bottom of annular plate 33 so that a seal between sealing member 57 and plate 33 is effected before the bin valve is opened. Ram head 54 is internally threaded to permit installation, adjustment of height, and to permit complete removal of non-fixed assembly.

As is shown most perspicuously in FIG. 3, the ram head 54 has a plurality of radially-extending grooves 53 in the upper surface 51 thereof extending outwardly from a bore 56 extending through the ram from near the lower end thereof. A fitting 69 is adapted to connect the bore 56 to a line 71 leading to a source of compressed air.

For the purpose of removing air continuously from the hopper to a dust collection system, pipe 67 is provided having a portion extending to near the top of the bin so that catalyst will find its way thereinto.

Bin support beams 75 are provided adjacent the hopper. The beams may be connected to other adjacent supporting structure (not shown).

In operation, the bin 1 is simply lowered over the hopper 3 until sealing member 57 engages the annular plate 33 to establish a positive seal and the ram 43 pushes the valve plate 30 upwardly a predetermined amount controlled by fixed dimensions of bin, bin support, and hopper. Sealing member 57 engages plate 33 before the surface 51 of ram head 54 engages valve plate 30 so that no expensive particulate catalyst is lost during the transfer operation and to maintain a clean surface on sealing member 57 at all times. The relative positions of the various members during the transfer operation after the bin valve is opened is shown in FIG. 5. Air is removed from the top of hopper 3 through pipe 67 during the dumping operation. A sonic level indicating device 48 is installed in sleeve 49 below sealing member 57 and above sleeve 52 to signal when material level falls below this elevation, thus notifying the operator that the bin is empty. As illustrated in FIGS. 6 and 7, the sonic level indicating device 48 comprises a whistle comprising a substantially cylindrical body with a T slot comprising cuts 75, 76 in the underside thereof. Air is sucked through the whistle by the catalyst passing from the bin to the hopper. As the volume of catalyst flowing decreases, the pitch of the sound produced by the whistle will decrease. When the sound stops, the bin is empty. The bin valve is closed before breaking the seal between sealing member 57 and plate 33 when the bin is lifted from hopper 3.

When the bin is lifted from the supporting steel beams 75, compressed air may be released automatically or manually between valve plate 30 and ram head 54 through grooves 53 for the purpose of cleaning tapered surface 28 on gasket 31 before valve plate 30 closes the bin. This will assure a tight seal until the bin requires unloading again.

The invention is not necessarily to be restricted to the specific structural details or arrangement of parts herein set forth, as various modifications thereof may be effected without departing from the spirit and scope of the invention.

The objects and features of the invention having been completely described, what I wish to claim is:

1. Apparatus for transferring a fluidized particulate solid material between levels, comprising:
   a bin having a downwardly coning bottom with a central opening therein;
   a hopper having a cover plate with a central opening therein;
   an annular, upwardly facing valve seat at said bin central opening;
   a valve affixed to said bin above said bin central opening including a vertically movable closure plate for seating on said valve seat and means for urging said plate against said seat to close said bin central opening;
   a vertically positioned ram affixed to said hopper within said hopper, extending through said hopper cover plate central opening to above said cover plate to a level sufficiently high to engage said closure plate and lift said closure plate off of said valve seat;
   first, second, and third elongated, annular sleeves, said first sleeve being affixed to said cover plate at the edge of said cover plate central opening and extending vertically above and below said edge substantially concentrically around said ram, said second sleeve being in sliding fit around said ram, said third sleeve being in sliding fit within said first sleeve and affixed to said second sleeve;
   an annular plate affixed to said third sleeve normal thereto;
   annular sealing means on the upper surface of said annular plate disposed beneath said bin for sealing engagement therewith around said bin central opening; and
   means including a plurality of coil springs disposed beneath said annular plate and said cover plate, the upper end of said ram being positioned relative to said cover plate such that said cover plate engages said bin before said ram engages said closure plate.

2. Apparatus for transferring a fluidized particulate solid material between levels, comprising:
   a bin having a downwardly coning bottom with a central opening therein;
   a hopper having a cover plate with a central opening therein;
   an annular, upwardly facing valve seat at said bin central opening;
   a valve affixed to said bin above said bin central opening including a vertically movable closure plate for seating on said valve seat and means for urging said plate against said seat to close said bin central opening;
   a vertically positioned ram affixed to said hopper within said hopper, extending through said hopper cover plate central opening to above said cover plate to a level sufficiently high to engage said closure plate and lift said closure plate off of said valve seat;
   first, second, and third elongated, annular sleeves, said first sleeve being affixed to said cover plate at the edge of said cover plate central opening and extending vertically above and below said edge substantially concentrically around said ram, said second sleeve being in sliding fit around said ram, said third sleeve being in sliding fit within said first sleeve and affixed to said second sleeve;
   an annular plate affixed to said third sleeve normal thereto;
   annular sealing means on the upper surface of said annular plate disposed beneath said bin for sealing engagement therewith around said bin central opening;
   means including a plurality of coil springs disposed beneath said annular plate and said cover plate, the upper end of said ram being positioned relative to said cover plate such that said cover plate engages said bin before said ram engages said closure plate;
   a plurality of radial grooves in the face of the upper end of said ram; and
   a bore extending through said ram, opening at one end of said ram at the inner extremity of each of said radial grooves, and adapted for connection at the other end of said ram to a source of compressed air.

3. Apparatus for transferring a fluidized particulate solid material between levels, comprising:
   a bin having a downwardly coning bottom with a central opening therein;
   a hopper for said bin;
   a normally closed valve comprising an annular flange around said central opening having an upwardly facing valve seat, an open-bottomed, cylindrical, stationary member supported above said opening, a movable valve member slidable in said cylindrical member positioned to engage said valve seat to close said opening and movable upwardly into said cylindrical member, said movable valve member having a plate member for seating on said valve seat and a coil spring positioned between said plate and said stationary member to urge said plate into seating engagement on said valve seat;
   an elongated, vertically positioned ram having a horizontal upper face, affixed to said hopper and centrally positioned therein to extend above said hopper and engage said valve plate;
   a cover plate affixed to said hopper and extending inwardly therefrom, said cover plate having a central opening substantially under said valve, through which said ram extends;
   first, second, and third elongated annular sleeves, said first sleeve being affixed to said cover plate at the edge of said opening and extending vertically above and below said edge substantially concentrically around said ram, said second sleeve being in sliding fit around said ram, said third sleeve being in sliding fit within said first sleeve and affixed to said second sleeve;
   an annular plate affixed normal to the upper edge of said third sleeve;
   annular sealing means on the upper surface of said annular plate disposed directly beneath said annular flange for sealing engagement therewith;

a plurality of vertical guide rods affixed to the underside of said plate and extending through said cover plate;

a plurality of coil springs around said guide rods between said cover plate and said annular plate;

a plurality of radial grooves in the upper face of said ram; and a bore extending through said ram, opening at one end at the inner extremity of each of said grooves, and adapted for connection at the other end thereof to a source of compressed air.

References Cited in the file of this patent
UNITED STATES PATENTS

| | | |
|---|---|---|
| 445,608 | Pollock | Feb. 3, 1891 |
| 2,075,931 | Eades | Apr. 6, 1937 |
| 2,305,724 | Luetzelschwab | Dec. 22, 1942 |
| 2,753,884 | Lindsay | July 10, 1956 |
| 2,874,733 | Sesler | Feb. 24, 1959 |